Oct. 10, 1944.　　　　W. C. GOSS　　　　2,359,910
CARBON ACTIVATOR
Filed Oct. 19, 1942　　　7 Sheets-Sheet 1
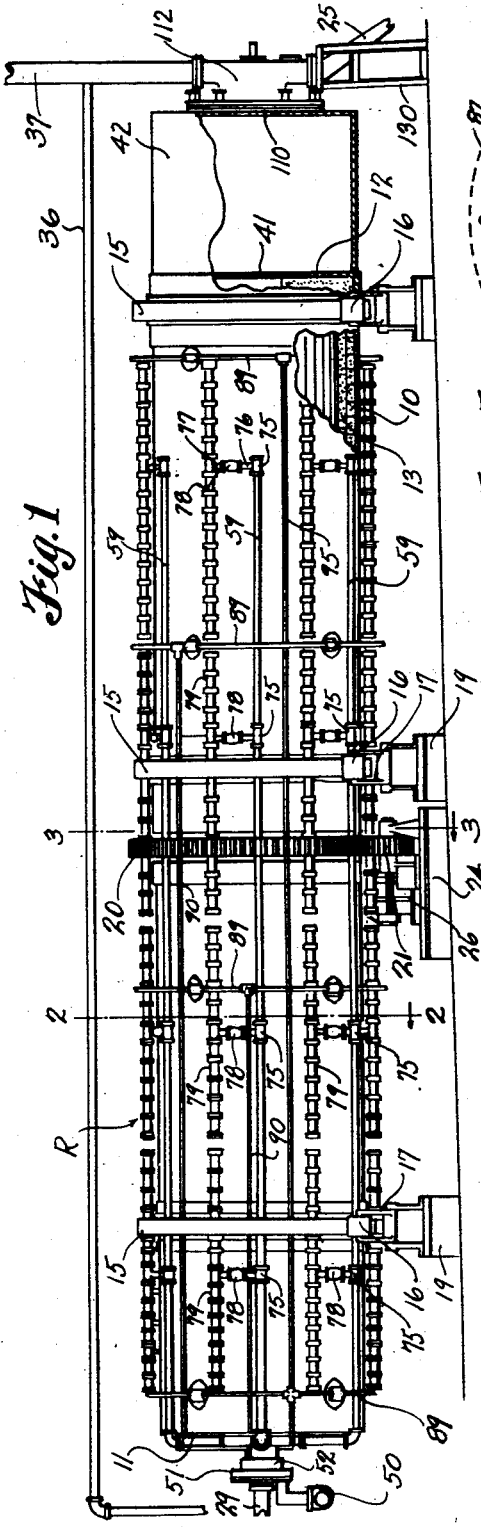
INVENTOR
WORTH C. GOSS
BY
Cook & Robinson
ATTORNEY Oct. 10, 1944.　　　W. C. GOSS　　　2,359,910
CARBON ACTIVATOR
Filed Oct. 19, 1942　　　7 Sheets-Sheet 2
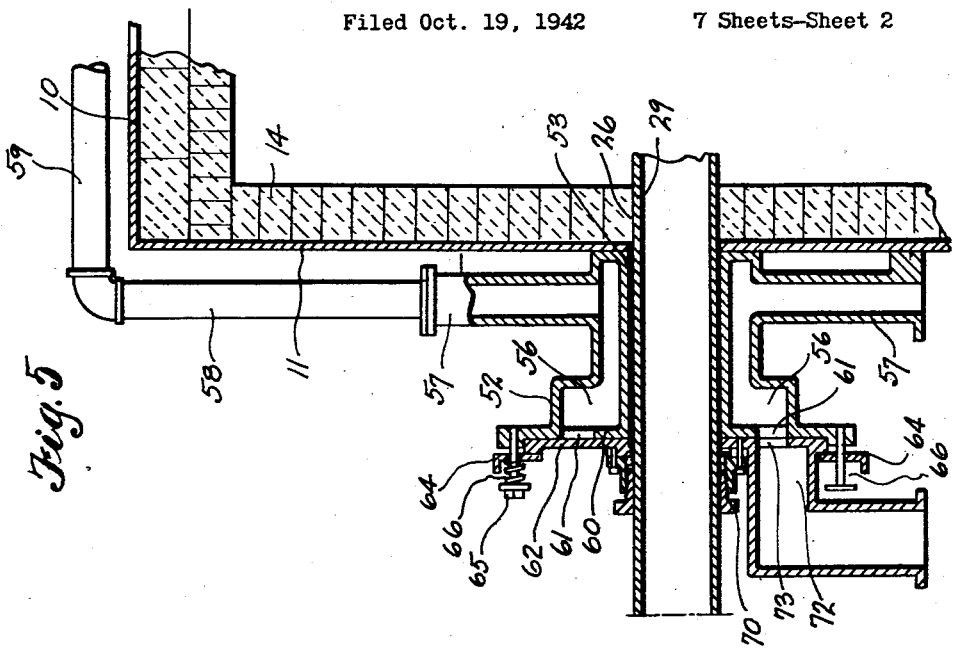
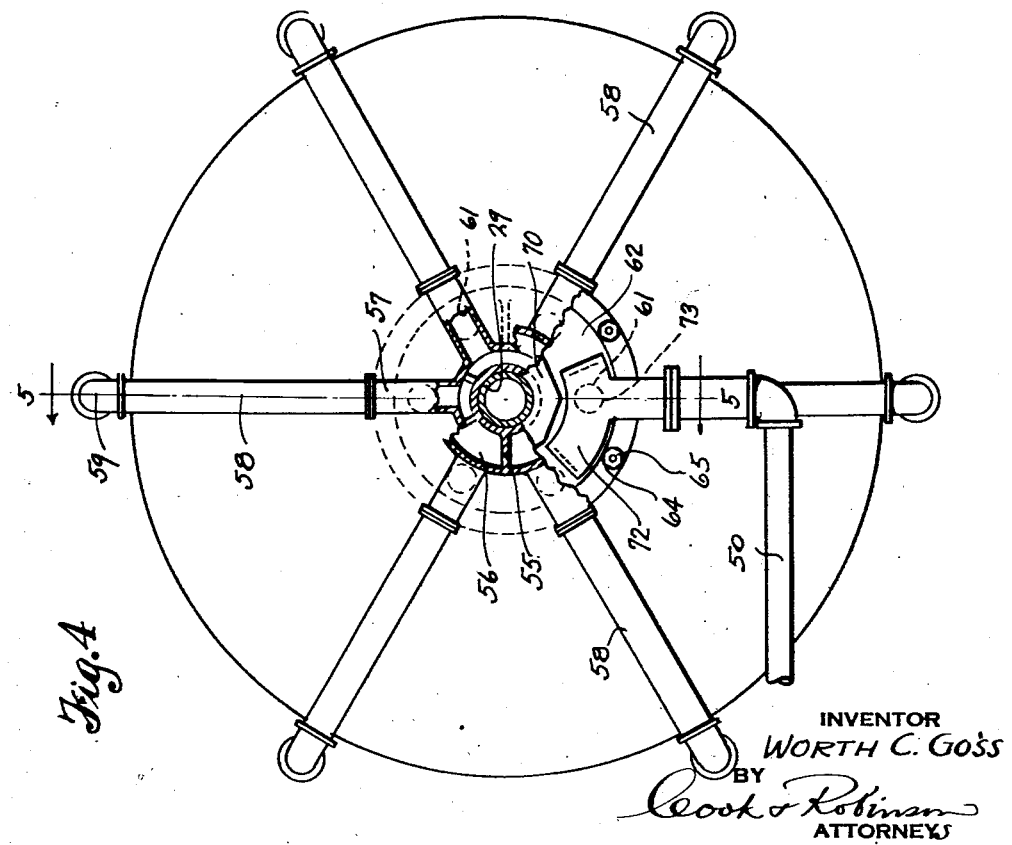
INVENTOR
WORTH C. GOSS
BY
Cook & Robinson
ATTORNEYS

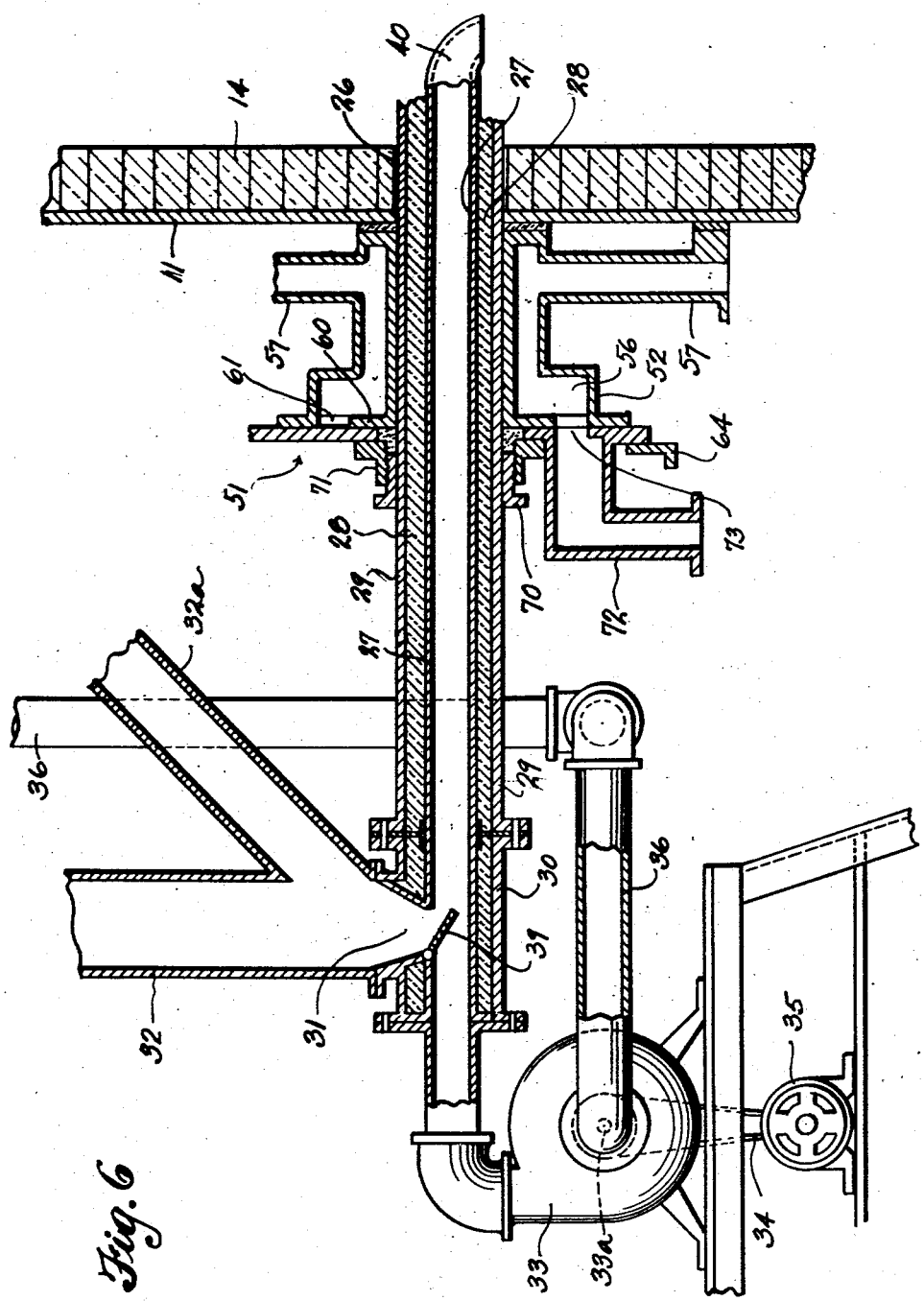

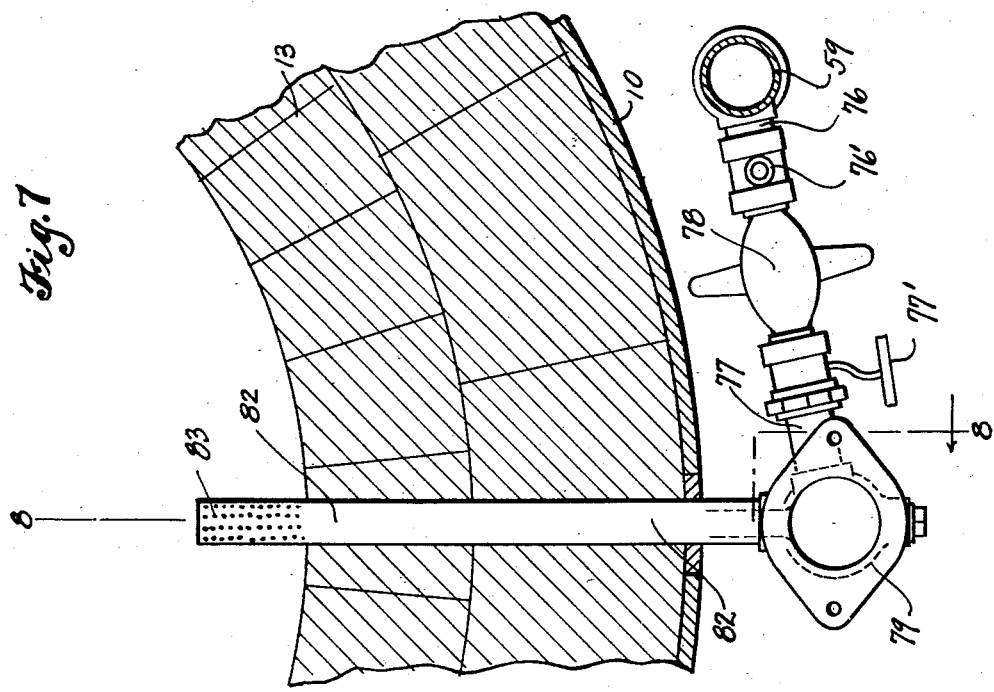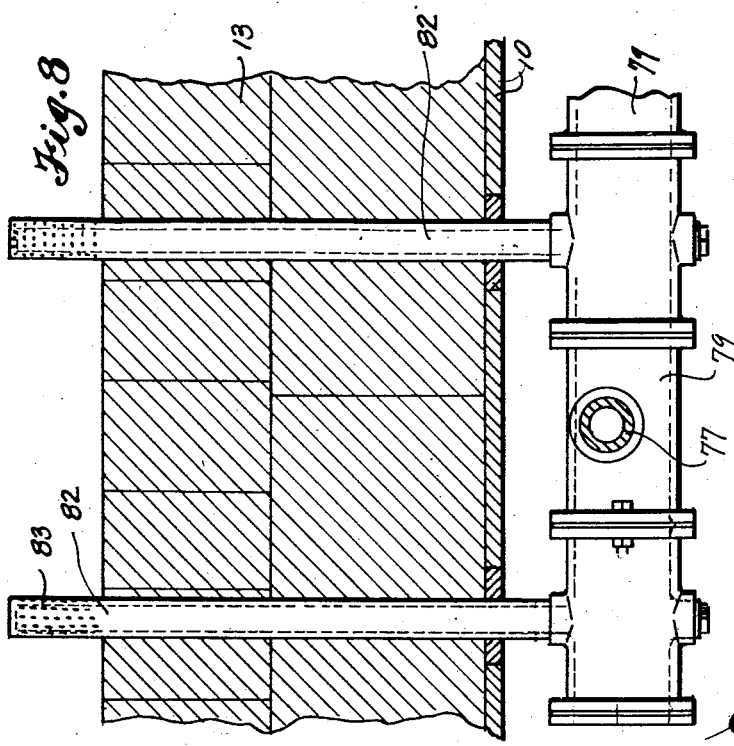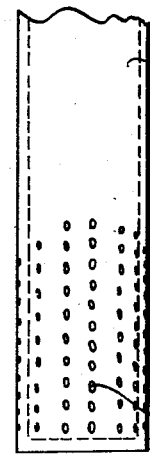

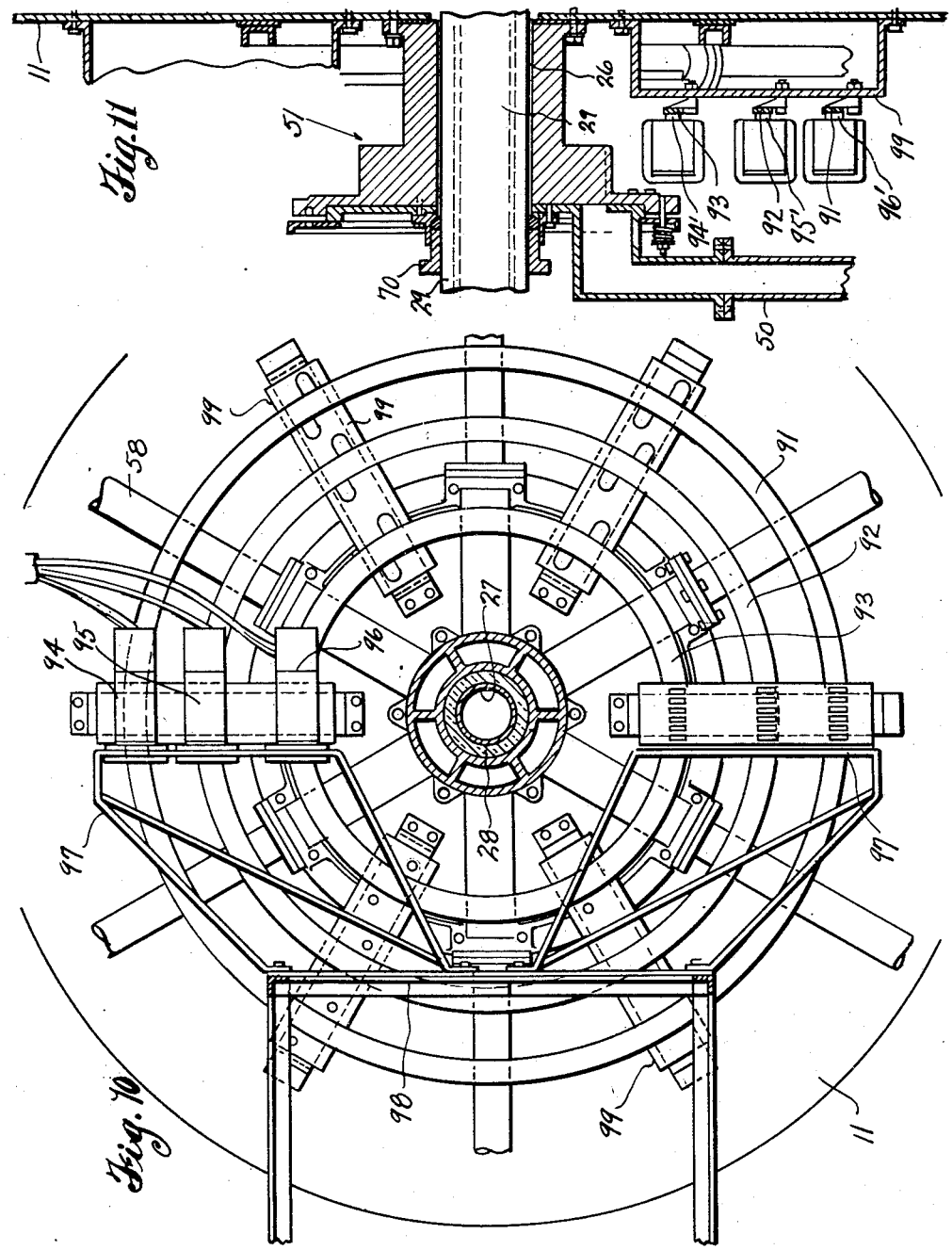

Oct. 10, 1944.  W. C. GOSS  2,359,910
CARBON ACTIVATOR
Filed Oct. 19, 1942  7 Sheets-Sheet 6
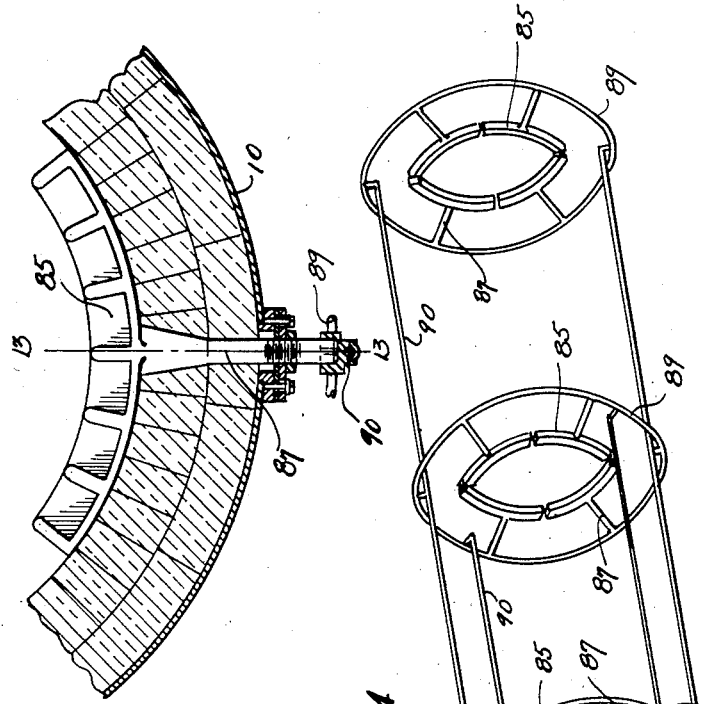
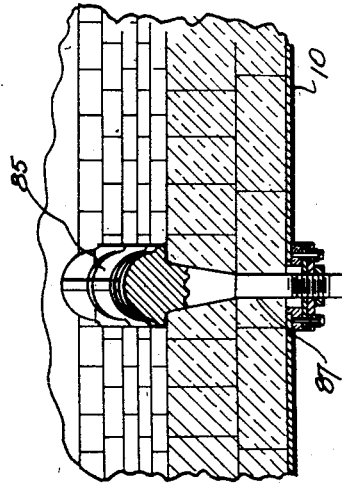
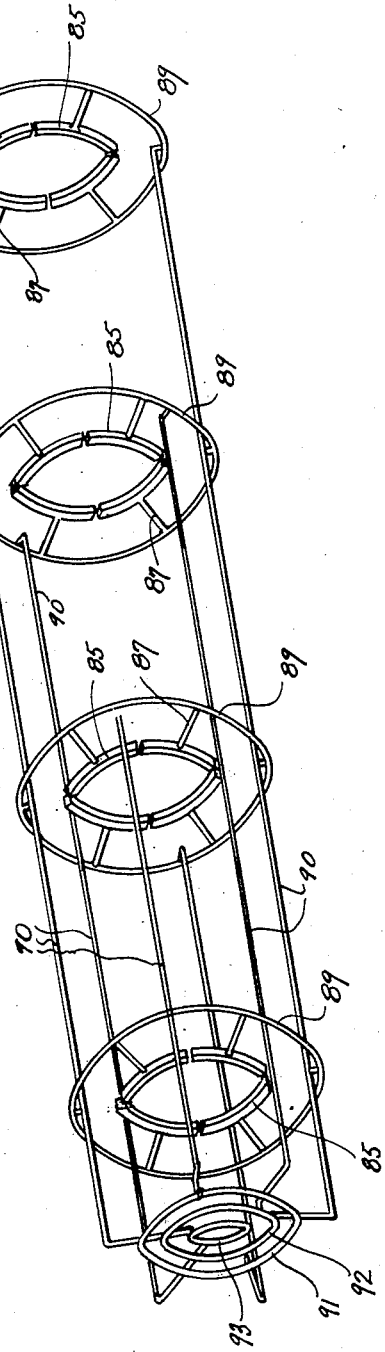
INVENTOR
WORTH C. GOSS
BY
Cook & Robinson
ATTORNEY

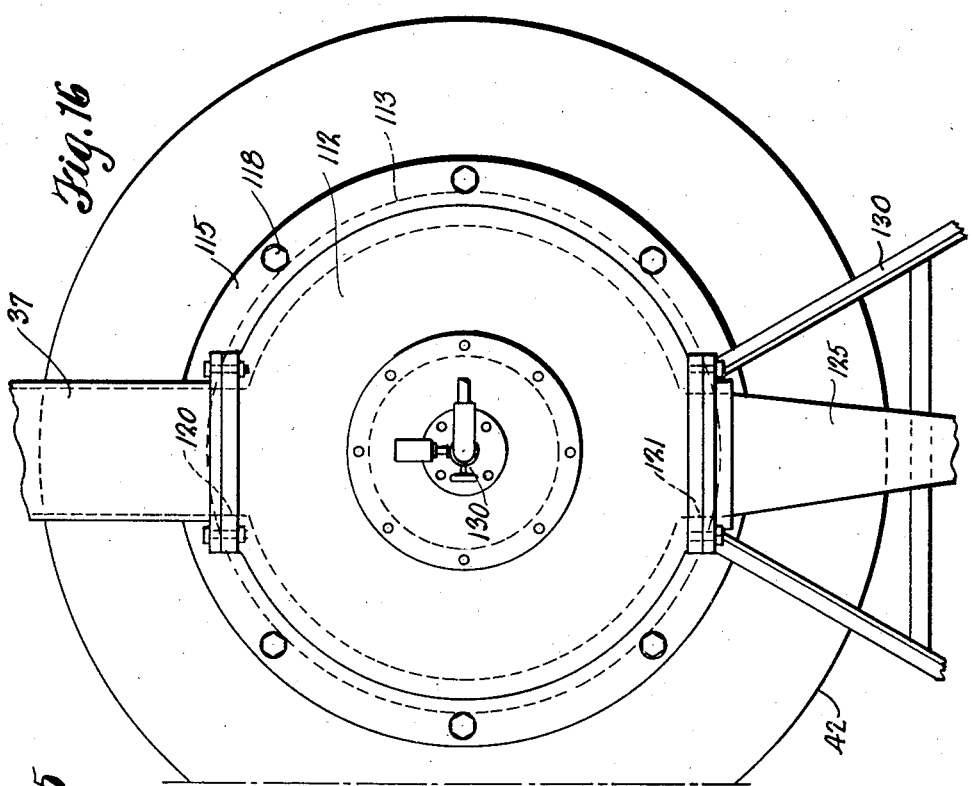
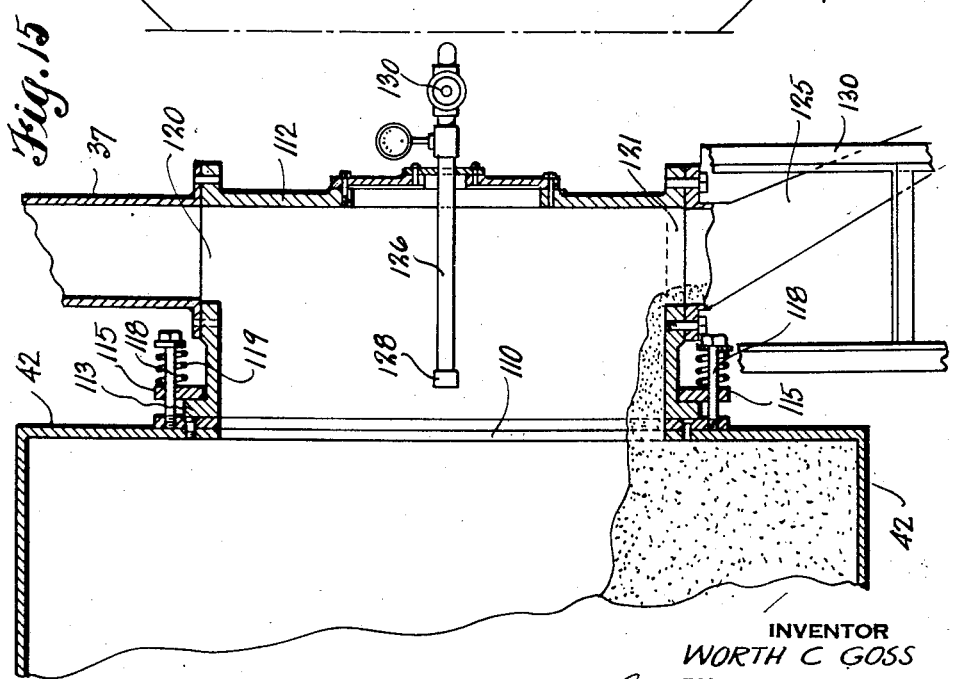

Patented Oct. 10, 1944

2,359,910

UNITED STATES PATENT OFFICE 2,359,910

CARBON ACTIVATOR

Worth C. Goss, Seattle, Wash., assignor to William A. Carlisle, Jr.

Application October 19, 1942, Serial No. 462,491

7 Claims. (Cl. 13—7)

This invention relates to the activating of carbon, and has reference more particularly to improvements in apparatus for the steam activation of granular carbon, such as that prepared for, or which is of the nature of that adapted to be used in gas masks, purification apparatus or for various analogous uses; it being the principal object of this invention to provide novel mechanical apparatus, including a retort of large capacity, wherein granular carbon may be effectively activated by the controlled application of steam thereto along with heat of high degree that is produced by a flow of electric current through the body of carbon material under treatment.

More specifically stated, the objects of the present invention reside in the provision of an activator for granular carbon comprising an elongated, cylindrical retort, rotatably driven and supported at a slight downward incline whereby to effect the automatic advancement of the material that is received thereinto at one end for discharge therefrom at the opposite end, and wherein steam jets are arranged for operation under control of a master valve mechanism, to discharge the steam for activation in controlled quantity directly into the body of material as it is advanced within the retort; heat of the required high degree being furnished by a controlled flow of electric current through the carbon, acting as resistance, between electrodes that are placed at spaced intervals within the retort.

Other objects of the present invention reside in the novel details of construction of the cylindrical retort, in the means provided for conducting the steam into the retort and for the controlled discharge thereof into the carbon.

Still further objects of the present invention reside in the novel details of construction of parts; in their combination and in the method or mode of accomplishing the activation, as will hereinafter be fully described.

In accomplishing these and other objects of the invention, I have provided the improved details of construction, the preferred forms of which are illustrated in the accompanying drawings, wherein—

Fig. 1 is a side view of the present mechanism particularly illustrating the cylindrical retort; a part of which is broken away for better illustration of interior structure.

Fig. 2 is an enlarged, transverse section of the retort on line 2—2 in Fig. 1, illustrating its means of support.

Fig. 3 is an enlarged, transverse section of the retort on line 3—3 in Fig. 1, showing the disposition of the retort rotating gearing.

Fig. 4 is an enlarged end elevation of the rotary retort, showing the radial arrangement of distributing pipes from the master valve for steam control, parts being broken away for better illustration.

Fig. 5 is an enlarged cross sectional detail axially of the master valve.

Fig. 6 is an enlarged, sectional view of the carbon supply and delivery means at the receiving end of the retort.

Fig. 7 is an enlarged cross sectional view of a portion of the retort wall showing a steam discharge nozzle as applied thereto, and the steam control valve.

Fig. 8 is a sectional view on the line 8—8 in Fig. 7.

Fig. 9 is an enlarged side view of an end portion of one of the steam discharge nozzles.

Fig. 10 is an enlarged end view of the retort, particularly illustrating the electric circuit connections with the circuit distributing rings applied to the retort.

Fig. 11 is a cross section of parts seen in Fig. 10.

Fig. 12 is a cross sectional detail, illustrating the mounting of one of the circuit electrodes in a wall of the retort.

Fig. 13 is a cross section on line 13—13 in Fig. 12.

Fig. 14 is an isometric view diagrammatically showing the relationship of electric circuit distributing means as applied to the retort.

Fig. 15 is an enlarged sectional detail in the vertical axial plane of the discharge end portion of the retort.

Fig. 16 is an elevation of the discharge end of the retort.

The present machine is designed primarily for the activation of granular carbon as prepared by the methods and machines described and illustrated in my copending applications entitled: Method of and apparatus for preparation of carbon, Serial No. 455,818, filed August 22, 1942, wherein the first mentioned application describes a means for the carbonization of briquettes made from compressed comminuted wood material and wherein the latter application describes the grading and classifying of the granulated material. The granular material, as prepared for activation in the present apparatus, being of a size to pass through a six to thirty mesh screen.

Briefly described, the present invention is embodied in an elongated, cylindrical, rotatably mounted retort, equipped at one end to receive a steady flow of the granular carbon that is to be activated, and at its other end is equipped for the discharge of the activated carbon after it has been advanced within the retort from its receiving to the delivery end. This retort is rotatably driven and is slightly downwardly inclined for the automatic advancement of the material at a rate consistent with the objects to be attained, and extended into the retort through the side walls thereof are steam discharge nozzles connected through suitable pipe lines and a master valve mechanism with a source of steam supply. The master valve is of a specific form of construction and has one part thereof fixed to the retort to rotate therewith for control of the delivery of steam to the steam distributing pipe lines in such way that steam flows to the nozzles only while they are covered by the body of carbon; steam being shut off or admitted to the nozzles through the master valve, due to the rotation of the retort. The retort also is equipped with electrodes connected with a source of electric current and arranged in the retort in such way that the carbon body will serve as conductor resistance from which the required activating heat emanates. Automatic controls are provided both in connection with the steam delivery and the electric current supply to insure the proper, and a varied distribution of steam and heat along the length of the retort.

Referring more in detail to the drawings—

In Fig. 1, I have shown the present rotary retort in side elevation, and it is designated in its entirety by reference character R. In its present construction, it comprises an elongated, cylindrical drum, which in actual use, is supported at a slight downward incline from receiving to discharge end. To impart a better understanding of the apparatus, it will be stated that the retort, as now constructed and in operation, is approximately sixty feet long, nine feet in outside diameter and six feet inside diameter, and is set at an incline of approximately one degree.

As will be understood best by reference to Figs. 1 and 5, the retort R comprises a cylindrical shell 10, of boiler plate, closed at its opposite ends, respectively, by metal walls 11 and 12. The interior of the shell has a heavy lining 13 of refractory material for the retaining of the high heat as has been shown particularly in Figs. 2 and 3.

Fixed to the shell 10 and encircling the retort near its opposite ends, and also at the center, are metal tires 15 which support the retort for rotation and which ride upon rollers 16 mounted in alinement and in pairs by rocker frames 17 which, in turn, are mounted by pivots 18 in base frames 19, as shown best in Fig. 2. The preferred arrangement employs two rollers 16 in each rocker frame, and the rocker frames are mounted by the base frames symmetrically at opposite sides of the vertical, axial plane of the retort.

In order to rotate the cylindrical drum on its support, there is provided a driven ring gear 20 fixed to and encircling the shell near its center, as seen in Figs. 1 and 3, and meshing with this is a driving gear pinion 21 which is carried by a horizontal shaft 22 mounted in supports 23 on a bed frame 24. An electric motor 25, mounted on the bed frame, is connected through a reduction gear mechanism indicated generally at 26 in Fig. 3, to drive the gear wheel 21. In this operation, the retort is rotated at a rate of approximately three-fourths turn per minute, and this rotation, in consideration of the slope of the retort, causes the granular material to be advanced through the machine in approximately sixteen to twenty hours.

Details of construction of the receiving end of the retort are shown in Figs. 4, 5, 6, 10 and 11. In Fig. 6, it will be observed that the end wall 11 of the retort has a refractory lining 14 and at the axial center, this wall has an opening 26 through which the material supply tube enters. This supply tube comprises an inner, metal tube 27 encased in a heat resisting lining 28, and this, in turn, is encased within an outer, metal tube 29. At its outer end, the tube 29 is flanged and bolted to a fitting 30 having a hopper-like top opening 31 to which the delivery ends of carbon supply tubes 32—32a connect. Attached to the outer end of the fitting 30 is a rotary blower 33 having its drive shaft 33a driven through a belt connection 34 by an electric motor 35. Hot inert gas is supplied to the blower through a pipe 36 and this extends to and draws hot gas from a stack 37 connected with the cooling drum, presently described, that is mounted on the shell at the discharge end of the retort and through which heated gases escape.

Depending into the pipe 27 from the hopper opening 31 at the side nearest the blower connection, is a valve plate 39 adjustably fixed in the passage and inclined in a direction toward the retort. Gas from the blower, entering forcibly from back of this plate, drives the granular carbon through the feed tube into the retort. At its discharge end, the pipe 27 has a downwardly directed nozzle 40 which causes the carbon to be deposited close to the end wall within the retort chamber.

It is understood that granular carbon is delivered through pipes 32 or 32a, or both, to the blower tube 27. In the operation of the apparatus, the carbon bed will eventually fill approximately the lower half of the rotort throughout its length, as indicated in Fig. 2; it being understood that the end wall 12 is formed with a central opening 41, of about 24 inches in diameter through which the activated carbon falls from the retort proper into the cooling drum which in Fig. 1 is indicated generally by numeral 42.

The present invention anticipates the activation of the granular carbon by the combined actions of steam and heat. The steam used in the operation is directly applied and is admitted into the body of the material at close intervals throughout the length of the retort and the heat, at predetermined and controlled temperatures, likewise is applied throughout the length of the retort.

Steam at 262° F. and at a pressure of approximately twelve pounds, is supplied to the receiving end of the retort through a supply pipe 50 and is admitted from this pipe to the retort through a distributing valve mechanism which is designated in its entirety by reference numeral 51 in Fig. 1. This valve mechanism, as shown in detail in Figs. 4, 5 and 6, comprises a valve body housing 52 formed with a central, coaxial passage 53 through which the carbon feed pipe 29 extends for rotation of the valve body thereabout. This housing 52 is fixed to the end wall of the retort to rotate therewith, and it is formed with an annular chamber that is divided by radial walls 55, noted in Fig. 4, into six equally spaced, separate compartments 56 from each of which a radial outlet tube 57 extends. To these outlets, distributing pipes 58 are attached and they extend to slightly beyond the periphery of the end wall and there they connect individually with steam distributing pipes 59 that extend lengthwise of and substantially the full length of the retort.

The front, or outer end, of the valve housing 52 is closed by a wall 60 in which openings 61, corresponding to the several chambers 56, are provided at equally spaced intervals. Over this end wall, there is fitted a stationary plate or disk 62 held in place by an annular ring 64 that overlies the peripheral portion of the disk and is secured by a plurality of bolts 65 which extend through openings in the ring and are threaded into an extended flange of the housing end wall 60. Coiled springs 66 are located about the bolts to bear inwardly against the ring 64 and there are held by washers 67 applied to the outer ends of the bolts.

A packing gland 70 is fitted about the tube 29 and is threaded into a fitting 71 that is fixed on the disk 62 to prevent leakage of gas about the pipe.

As shown in Figs. 4 and 5, the supply pipe 50 connects with a manifold 72 on disk 62 below the center, and this manifold has an opening 73 through the disk. As the valve housing 52 rotates, the holes 61 therein successively pass in registration with the manifold opening for the admittance of steam through the chambers 56 to the pipes 59.

The steam distributing pipes 59 which extend longitudinally of the retort are equipped at spaced intervals with fittings 75 whereby pipe connections 76 and 77 are made, as seen in Fig. 7, through pressure reduction valves 78 with headers 79. These headers extend lengthwise of the retort and those which are connected with the same pipe 59 are in alinement end to end. In the present showing, there are four headers supplied with steam through each pipe 59, and the pressure regulating valves 78 therefor are so adjusted that the pressure of steam as supplied to the headers successively from the receiving end of the retort is gradually increased. For example, the first header of the series receives steam at four pounds gauge pressure, while the last one of the series receives it at 5 pounds gauge pressure or as required to regulate retort temperature.

Connected with each header, at relatively close intervals, and extended through the retort wall and the refractory lining, are steam delivery nozzles 82 and these, as has been shown best in Figs. 7, 8 and 9, extend just slightly into the retort chamber and are formed with small ports 83 through which the steam will be discharged in small jets.

By reference to Fig. 7, it will be observed that a shut-off valve 76' is embodied in the connection 76 and a pressure gauge 77' has connection with pipe 77 so that the gauge pressure of steam as admitted may be determined.

In operation of the retort, the control of steam admittance as provided for by the valve 51, is such that steam will be supplied through pipes 59 and their connecting headers to the corresponding nozzles only while the nozzles are covered by the carbon bed, and is entirely cut off therefrom while they are outside the carbon bed. Thus, there is no waste of steam.

In the present instance, the steam nozzles are in six rows, equally spaced angularly about the retort and at intervals of approximately two feet in the longitudinal direction of the retort.

For the purpose of maintaining the necessary heat within the retort to accomplish the activation of the prepared carbon particles, electric current is caused to flow through the body of carbon material. Flow of this heating current within the retort is between electrodes 85 disposed in spaced relationship in the longitudinal direction of the retort chamber.

By reference to Figs. 3 and 14, it will be understood that the electrodes 85 are arranged in sets of four, circumferentially aligned about the interior of the retort chamber and that there are four of these sets of electrodes. Extended radially outward from each electrode through the insulation and shell is a binding post 87. These posts are insulated from the shell 10 and all of those of each set are joined with a conductor ring 89 which encircles the retort.

By reference to Fig. 1, it will be observed that conductor rings 89 are located about the retort close to its ends and that there are two rings between these end rings. Also, it is to be pointed out that the spacing between rings, and incidentally the spacing between successive sets of electrodes decreases from the intake end of the machine to the discharge end. This variation in spacing is for the purpose of obtaining the required uniform heat throughout the length of the retort.

Electric current to the conductor rings 89 is supplied through conductors 90 that extend lengthwise of the retort and as shown diagrammatically in Fig. 14. There are two conductors 90 leading to each ring 89, at 180° spacing about the retort; paired conductors being joined to distributer rings 91—92 and 93 which are mounted on the end of the retort coaxial thereof. In contact with the distributer rings, respectively, are two sets of brushes 94, 95 and 96 and 94', 95' and 96' of a three-phase current supply; the arrangement being such that current flows, first, between the first and second series of electrodes, then between the second and third sets, then between the third and fourth sets; this cycle being repeated continuously. Furthermore, it is to be understood that current flow is through the body of carbon only and this, serving as resistance, becomes heated and thus supplies the activating temperature.

As a detail of construction, it is shown in Figs. 10 and 11 that the brushes 94, 95 and 96 and 94', 95', 96' are mounted by brackets 97 fixed to a stationary frame structure 98 at the receiving end of the retort and that the conductor rings 91—92 and 93 are mounted by brackets 99 fixed to the end wall of the retort.

When the activated carbon falls through the discharge opening 41 in the end wall 12, it is caught in the cooling drum 42. This is a cylindrical housing, substantially of the same diameter and fixed to the end wall of the retort, coaxial thereof. At its outer end, this drum has an opening 110, as noted best in Fig. 15, with which the side opening of a discharge housing 112 is registered. The housing 112 has an annular flange 113 about the opening 110 against which an annular clamp ring 115 is seated to hold the parts functionally assembled, and bolts 118 are applied through the ring and into the end wall of housing 41, and coiled springs 119, applied about the outer portions of the bolts, act against the ring to hold the parts together; this arrangement of parts being like that at the receiving end of the machine for functional association of the steam valve housing 52 and manifold 72. Connected with the top of housing 112 through an opening 120 is the stack 37, previously mentioned, and connected with the base of the housing, through an opening 121, is a discharge chute 125 through which the activated carbon is delivered from the machine.

The housing 112 is supported and held against rotation by a stationary frame structure 130 which has been shown in Figs. 15 and 16.

For the purpose of facilitating the cooling of carbon as it enters the drum 42, I have provided a water spray device comprising a water supply pipe 126, directed centrally toward the opening 110 and equipped at its end with a nozzle 128. Water is admitted to the spray pipe under pressure through a control valve 130. From the nozzle, finely atomized water is discharged into the drum and this expedites cooling of the product.

With the understanding that the retort is so constructed, the operation for the activating of carbon would be as follows: The prepared carbon would be admitted to the retort from the supply pipes 32 and 32a and through the feed tube 27 under the injecting action of the fan blower mechanism, as shown in Fig. 6. After the rotating retort has been filled to an appreciable extent throughout its length, steam and electric current are supplied; the steam being admitted through valve 51 which operates to supply steam to the headers connected with the carbon covered nozzles. Electric current flows between the electrodes that are arranged along the retort when circuit connection is provided through the carbon body.

Activated carbon falls through the discharge opening of the retort to the cooling drum, and from there is discharged to storage or point of further treatment.

It is to be understood that the flow of carbon into the retort can be regulated so as to keep a desired volume and level of material therein. Also, the control devices associated with the steam delivery and current supply operate to supply heat and steam as required for proper activation of material.

The rotation of the slightly inclined retort automatically effects a progressive forward advance of material with a constant turnover that insures uniform treatment of all material. The special valve device 51 insures against any loss or waste of steam and the distribution of current to the electrodes in the manner disclosed makes possible the required heat control with greatest economy.

Having thus described my invention, what I claim as new therein and desire to secure by Letters Patent is:

1. In an apparatus of the character described, an elongated, horizontally disposed cylindrical retort, means supporting the retort for axial rotation, means for supplying material to be activated into the retort to maintain a charge therein of substantial depth throughout the length of the retort, means for rotating the retort to effect a constant roll-over of the charge, means for supplying activating heat to the charge, a source of supply of steam and nozzles connected with said source of supply of steam mounted in the walls of the retort and opening thereinto at intervals therealong for delivery of steam into the material as it covers the nozzles.

2. In an apparatus of the character described, an elongated cylindrical retort, means supporting the retort for rotation and in position for automatic advancement of material from its receiving to its discharge end, means for supplying material for activation into the retort at its receiving end to maintain a charge therein of substantial depth the length of the retort, means for axially rotating the retort to effect a rollover of material and its automatic progressive advancement to the delivery end of the retort, means for supplying activating heat to the charge, a source of supply of steam and a plurality of nozzles connected with the source of supply of steam and mounted within the walls of the retort to open into the retort for injection of steam into the material while it covers the nozzles; each of said nozzles having an end portion extended into the retort and formed with a plurality of perforations thereabout.

3. In an apparatus of the character described, an elongated cylindrical retort provided at its opposite ends, respectively, with receiving and discharge openings, means revolubly supporting the retort at a slight downward incline from its receiving toward its delivery end, means for supplying material to the retort through the receiving opening whereby to maintain a charge of substantial depth throughout the length of the retort, means for axially rotating the retort to cause a constant roll-over of material and its progressive advancement to the discharge opening, steam supply devices in the retort at intervals about the walls thereof, each designed to be covered by the material during a part of each rotation of the retort, means operable to supply steam to said devices only while covered by material, and means for supplying activating heat to the material.

4. In an apparatus of the character described, an elongated cylindrical retort provided centrally at opposite ends respectively, with receiving and discharge openings, means supporting the retort for axial rotation at a slight incline downwardly from its receiving to discharge ends, means for the delivery of granular material for activation into the retort at its receiving end whereby to maintain a charge of material throughout the length of the retort of substantial depth, means for rotating the retort to effect a constant roll-over of material therein and an automatic progressive advancement of material toward the discharge opening, steam supply nozzles extended through the retort walls at intervals thereabout, each to be covered during a part of each rotation by the material, means within the retort for supplying activating heat to the material and means for supplying steam to the nozzles.

5. In an apparatus of the character described, an elongated cylindrical retort provided at its opposite ends, respectively, with receiving and discharge openings, means supporting the retort for axial rotation at a slight downward incline from receiving to its discharge end, means for supplying material to the retort through the receiving opening to maintain a charge of substantial depth throughout the length of the retort, means for axially rotating the retort to effect a constant roll-over of material therein and its automatic and progressive advancement to the discharge opening, means within the retort for supplying activating heat to the material therein, a plurality of rows of steam nozzles, lengthwise of and spaced about the retort and extending through its walls, a source of steam supply, and a valve operable to supply steam from said source to said nozzles only during their travel through a predetermined interval across the bottom of the arc of rotation.

6. An apparatus as in claim 5 wherein the valve is operable in accordance with and incident to rotation of the retort to control the admittance of steam to the longitudinal rows of nozzles.

7. In an apparatus of the character described, an elongated, cylindrical retort provided at its opposite ends, respectively, with receiving and discharge openings, means supporting the retort for axial rotation at a slight downward incline from its receiving to discharge end, means for supplying material for activation into the retort through its receiving opening to maintain a charge of substantial depth throughout the length of the retort, means for axially rotating the retort, means within the retort to supply activating heat, steam headers mounted at regularly spaced intervals about the retort and extending lengthwise thereof, a plurality of steam injection nozzles extending from each header through the retort wall to the inside thereof to be covered by the material being activated as the nozzles pass across the bottom of the arc of rotation, a source of supply of steam, a control valve connected with said source, and a valve member rotatable with the retort to admit steam to the headers as they pass across the bottom of the arc of rotation.

WORTH C. GOSS.